(No Model.)
J. W. MALOY.
TRUCK FOR RAILWAY CARS.
No. 402,950. Patented May 7, 1889.
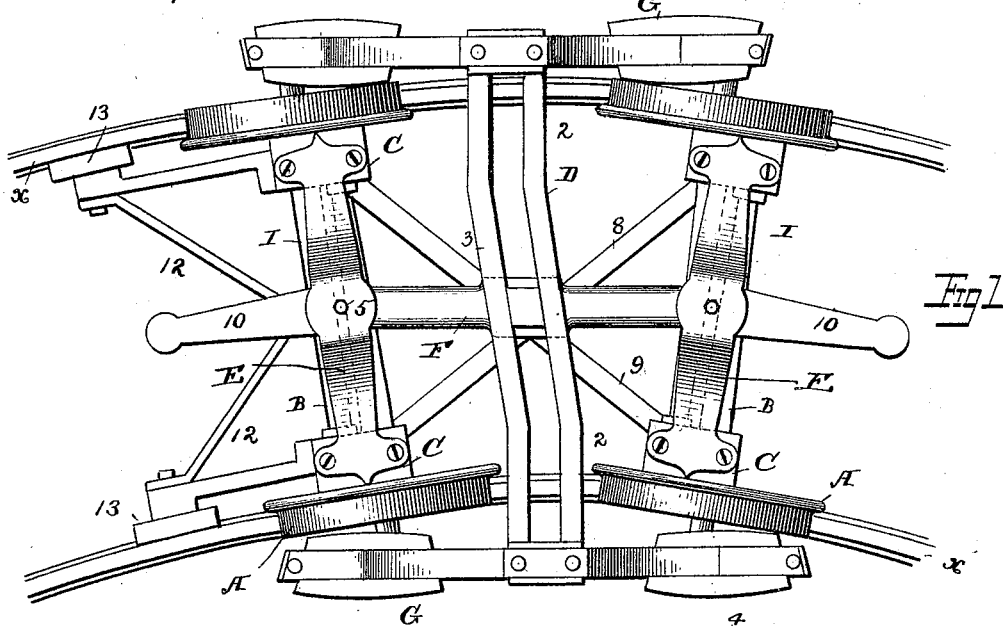
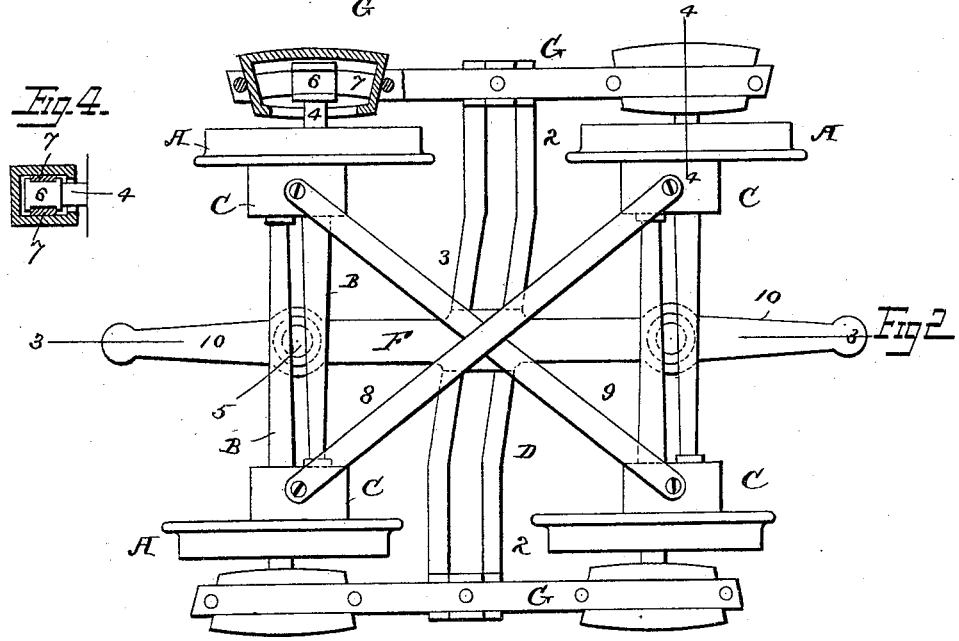
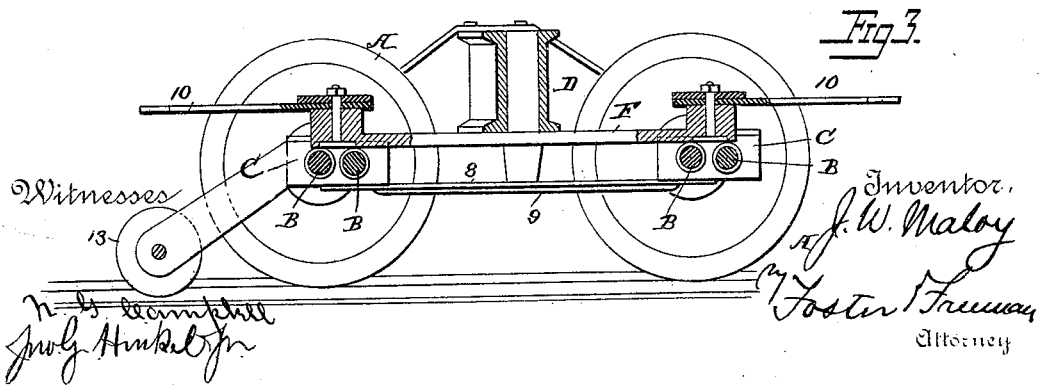

UNITED STATES PATENT OFFICE.

JAMES W. MALOY, OF MARIETTA, GEORGIA.

TRUCK FOR RAILWAY-CARS.

SPECIFICATION forming part of Letters Patent No. 402,950, dated May 7, 1889.

Application filed July 12, 1888. Serial No. 279,756. (No model.)

*To all whom it may concern:*

Be it known that I, JAMES W. MALOY, a citizen of the United States, residing at Marietta, in the county of Cobb and State of Georgia, have invented certain new and useful Improvements in Trucks for Railway-Cars, of which the following is a specification.

My invention relates to railway-cars, and more especially to railway-car trucks; and my invention consists in constructing the truck and in the arrangement of the wheels, axles, bearings, and connections thereof, as fully set forth hereinafter, so as to render each wheel independent of the rotation of the other wheels and facilitate the turning of curves.

In the accompanying drawings, Figure 1 is a plan view of a railway-car truck embodying my improvements. Fig. 2 is an inverted plan view in part section. Fig. 3 is a section on the line 3 3, Fig. 2; and Fig. 4 is a section on the line 4 4, Fig. 2.

Each wheel A of the truck is carried by a single axle, B, and the two axles of the opposite wheels lie parallel to each other; but instead of each axle extending past the edge of the opposite wheel, as heretofore, the bearing or box C of each axle is placed at a point inside of the opposite wheel, so that the two axles B B may be brought in close proximity to each other, and so that the two axles A A will be much more nearly in line than is possible in the ordinary construction.

In a four-wheel truck, as shown in the drawings, the two pairs of wheels are arranged as shown, so that the wheels on one side will be the same distance apart as those upon the opposite side of the truck, and the cross-bar or girder D of the truck, instead of being straight, as usual, lies at each end 2 midway between the wheels between which it passes, while the intermediate portion, 3, extends in a diagonal line between the portions 2.

The boxes C C are supported in any suitable manner; but, as shown, each box serves for the passage of the axle of the adjacent wheel and as a bearing for the inner end of the axle of the other wheel, so that each box is steadied and supported by one of the axles and serves as a support for the other.

The improvement above described is applicable to trucks having axles supported in stationary bearings, in which case the boxes C C are secured fixedly to some portion of the frame, and each axle is provided with an external journal, 4, fitting in a stationary box, as usual. In the construction of truck shown, however, the axles are movable in respect to the truck, so as to swing in passing curves to bring the axles in substantial accord with the radius-line of the curve, thereby avoiding the friction, wear, and risk which result from maintaining the axles at the opposite ends of the truck at all times parallel to each other.

In order to secure such an automatic action and adjustment of the parts, each pair of boxes C C at each end of the truck is carried by a frame, I, consisting of a cross-bar, E, connected to the two opposite boxes C C of one pair of axles. The cross-bar E is in the form of an arched girder, and is pivoted centrally to a bolt, 5, at the end of a center bar, F, of the frame, the said center bar being securely bolted to the cross-girder D, and each outer journal, 4, of each axle turns in a box, 6, which slides between curved guides 7 7, secured to the frame of the truck—as, for instance, to the side girders, G, thereof, the curve of the guides 7 corresponding to a circle having the adjacent bolt 5 for its center.

A connecting-rod, 8, is pivoted at one end to one of the boxes C, and extends diagonally beneath the frame to the diagonally-opposite box C, to which it is pivoted, and a connecting-rod, 9, is pivoted at the opposite ends to the other diagonally-opposite boxes C C, as best shown in Fig. 2, so that when one pair of axles is swung upon the supporting-pivot 5 the other pair of axles will also be swung to an equal extent upon its pivot, but in a reverse direction, thereby maintaining the coincidence between the lines of the opposite axles and radii drawn from some point parallel to said axles.

The automatic turning of the frame of the leading pair of wheels may be effected by means of an arm, 10, extending from said frame and connected by a link with the preceding car; but I prefer to provide the frame I with extensions 12 of suitable construction, supporting pilot-wheels 13, arranged so that their sides will contact with the sides of the rails *x x*, and thereby turn the leading-frame to its proper position, the other frame receiving its proper adjustment automatically through the cross-rods 8 9.

Instead of connecting the cross-rods to the boxes C, they may be connected diagonally to any part of the frames I I.

Without limiting myself to the precise form of construction and arrangement shown, I claim—

1. A railway-car truck provided at each end with a pair of wheels secured to a pair of axles arranged in proximity, the inner end of each axle turning in a box at the inner side of the adjacent wheel, and a cross-bar or girder, D, connecting the side girders, G G, of the frame extending diagonally with each end midway between the adjacent wheels, substantially as set forth.

2. The combination, in a railway-car truck, of supporting-wheels, an axle for each wheel, a box for the inner end of each axle arranged adjacent to the inner face of the adjacent wheel, and an external journal for each wheel, having its bearing in a box supported by the frame of the truck, substantially as set forth.

3. The combination, with a railway-car truck, of pairs of wheels, each having a separate axle, the axles of each pair of wheels arranged parallel to and overlapping each other and supported by a frame pivoted centrally to the truck, the opposite ends of the opposite frames being connected by diagonally-pivoted cross connecting-rods 8 9, substantially as set forth.

4. The combination, with the frame of a railway-car truck, of a pair of wheels at each end, each secured to a separate axle and each axle bearing with its inner end in a box adjacent to the inner face of one of the wheels, a frame, I, supported upon each pair of axles and pivoted to the truck-frame, and cross connecting-rods 8 9, extending between the opposite ends of the opposite frames I, substantially as set forth.

5. The combination, with the frame of a railway-car truck, of frames I I, pivoted thereto and supported each upon one of the pairs of wheels of the truck, and pilot-wheels 13, supported by the extensions of the frames, substantially as and for the purpose set forth.

6. The combination, in a car-truck, of frames I I, each supported at one end of the truck upon wheels having independent overlapping axles, as described, boxes C, each receiving the external journal of one of the axles, and sliding between curved guides upon the frame, and cross-rods 8 9, connecting the opposite frames, substantially as set forth.

7. The combination, in a car-truck, of a frame, a pair of wheels at each end, each supported by an independent axle, a box supporting the inner end of each axle adjacent to the inner face of one of the wheels, a box sliding between curved guides upon the frame receiving the external journal of each wheel, and cross connecting-rods 8 9, substantially as set forth.

In testimony whereof I have signed my name to this specification in the presence of two subscribing witnesses.

JAMES W. MALOY.

Witnesses:
GEO. F. NEWELL,
A. Y. LEAKE.